(12) United States Patent
Brackney et al.

(10) Patent No.: US 6,718,251 B2
(45) Date of Patent: Apr. 6, 2004

(54) SYSTEM FOR CONTROLLING EXHAUST EMISSIONS PRODUCED BY AN INTERNAL COMBUSTION ENGINE

(75) Inventors: Larry J. Brackney, Columbus, IN (US); Thomas A. Dollmeyer, Columbus, IN (US); George A. Brunemann, Cincinnati, OH (US)

(73) Assignee: Cummins, Inc., Columbus, IN (US)

( * ) Notice: Subject to any disclaimer, the term of this patent is extended or adjusted under 35 U.S.C. 154(b) by 178 days.

(21) Appl. No.: 10/059,505

(22) Filed: Jan. 29, 2002

(65) Prior Publication Data

US 2003/0144788 A1 Jul. 31, 2003

(51) Int. Cl.$^7$ ................................................ B60T 7/12
(52) U.S. Cl. ...................... 701/103; 701/110; 701/115; 123/321
(58) Field of Search ................................ 701/101, 102, 701/103, 108, 109, 110, 114, 123, 115; 123/677, 678, 687, 568.22, 436, 321; 60/276, 285

(56) References Cited

U.S. PATENT DOCUMENTS

| | | | |
|---|---|---|---|
| 5,041,976 A | 8/1991 | Marko et al. | |
| 5,386,373 A | 1/1995 | Keeler et al. | |
| 5,477,827 A * | 12/1995 | Weisman et al. | 123/436 |
| 5,539,638 A | 7/1996 | Keeler et al. | |
| 5,548,528 A | 8/1996 | Keeler et al. | |
| 5,572,424 A | 11/1996 | Kellogg et al. | |
| 5,682,317 A | 10/1997 | Keeler et al. | |
| 5,732,676 A * | 3/1998 | Weisman et al. | 123/436 |
| 5,941,918 A | 8/1999 | Blosser | |
| 5,970,426 A | 10/1999 | Mandel et al. | |
| 6,026,784 A * | 2/2000 | Weisman et al. | 123/436 |
| 6,098,012 A | 8/2000 | Stander et al. | |
| 6,152,102 A * | 11/2000 | Ruman | 123/295 |
| 6,220,223 B1 * | 4/2001 | Weisman et al. | 123/436 |
| 6,230,087 B1 | 5/2001 | Didomenico et al. | |
| 6,339,742 B2 * | 1/2002 | Weisman, II | 701/114 |

* cited by examiner

Primary Examiner—John T. Kwon
(74) Attorney, Agent, or Firm—Barnes & Thornburg

(57) ABSTRACT

A system for controlling exhaust emissions produced by an internal combustion engine includes an engine controller having an emission manager configured to produce a base emission level cap command, corresponding to a maximum allowable emission level of the engine, as a function of at least altitude and ambient temperature. The emission manager may also include one or more auxiliary emission control devices (AECDs), and the emission manager is further operable in such cases to determine a maximum allowable emission level associated with each active AECD. A final emission level cap command is determined as a function of the base emission level cap command and the maximum allowable emission level associated with each active AECD. The emission manager is further operable to produce a protection state data structure that includes information relating to the operational status of each AECD.

15 Claims, 8 Drawing Sheets

SYSTEM FOR CONTROLLING EXHAUST EMISSIONS PRODUCED BY AN INTERNAL COMBUSTION ENGINE

FIELD OF THE INVENTION

The present invention relates generally to systems for controlling exhaust emissions produced by an internal combustion engine, and more specifically to systems operable to control exhaust emissions by prescribing maximum allowable emission levels to be produced by the engine and further to such systems including Auxiliary Emission Control Device (AECD) accommodation.

BACKGROUND OF THE INVENTION

Systems for controlling exhaust emissions produced by an internal combustion engine are known and have been widely implemented, particularly in the heavy-duty diesel engine industry. Historically, the Environmental Protection Agency (EPA) has promulgated limits for allowable levels of certain exhaust emissions such oxides of nitrogen (NOx). However, such emission level requirements promulgated by the EPA are typically subject to frequent changes that are often difficult to integrate into existing engine control logic.

The EPA has recently provided for the possibility of allowing engine behavior that deviates from "normal" or expected engine operation while meeting emission requirements through the use of one or more auxiliary emission control devices or AECDs, wherein an AECD is defined for purposes of the subject invention as a software structure that defines, as a function of one or more engine operating parameters, a current operational state of the engine. As an example, a particular AECD may define an engine speed AECD responsive to at least a signal produced by an engine speed sensor to produce one or more control outputs. It is to be understood that this example is provided only by way of illustration and is not necessarily indicative of a practical AECD. In any case, the use of any one or more AECDs with a particular engine configuration is, at present, privately negotiated with the EPA by the individual engine manufacturer, and the number as well as the functions of the one or more permitted AECDs are accordingly considered by the various engine manufacturers to be highly confidential. Like emission requirements, AECD definitions permitted by the EPA are also subject to frequent changes, wherein assimilation of newly permitted AECDs as well as abandonment of, or changes to, existing AECDs are likewise difficult to implement into known engine control routines.

One drawback associated with known systems for implementing EPA-mandated emission requirements as well as negotiated AECD definitions is that there typically exists an interdependency between the emissions/AECD logic and the base engine control routines. What is therefore needed is a system that isolates emission requirements/allowances from base engine control logic. Such a system should be easily adaptable to changing emission requirements and/or AECD definitions and sufficiently flexible to accommodate any number of AECDs.

SUMMARY OF THE INVENTION

The foregoing shortcomings of the prior art are addressed by the present invention. In accordance with one aspect of the present invention, a system for controlling exhaust emissions produced by an internal combustion engine comprises an engine speed sensor sensing a rotational speed of an internal combustion engine and producing a speed signal corresponding thereto, means for determining an altitude of said engine and producing an altitude value corresponding thereto, means for determining an ambient temperature external to said engine and producing a temperature value corresponding thereto, means for determining an output torque produced by said engine and producing a torque value corresponding thereto, and a control computer determining a maximum allowable emission level as a function of said speed signal, said altitude value, said temperature value and said torque value, said computer controlling an air handling system of said engine as a function of said maximum allowable emission level such that exhaust emissions produced by said engine are limited to said maximum allowable emission level.

In accordance with another aspect of the present invention, a method of controlling exhaust emissions produced by an internal combustion engine comprises determining a rotational speed of an internal combustion engine, determining an altitude of said engine, determining an ambient temperature external to said engine, determining an output torque produced by said engine, determining a maximum allowable emission level as a function of said rotational speed, said altitude, said ambient temperature and said output torque, and controlling an air handling system of said engine as a function of said maximum allowable emission level such that exhaust emissions produced by said engine are limited to said maximum allowable emission level.

In accordance with a further aspect of the present invention, a system for controlling exhaust emissions produced by an internal combustion engine comprises means for determining a first operating parameter of an internal combustion engine and producing a first operating parameter value corresponding thereto, a first auxiliary emission control device (AECD) producing a first emission level as a function of at least said first operating parameter value, and a control computer determining a maximum allowable emission level as a function of said first emission level and a reference emission level, said computer controlling an air handling system of said engine as a function of said maximum allowable emission level such that exhaust emissions produced by said engine are limited to said maximum allowable emission level.

In accordance with yet another aspect of the present invention, a system for controlling exhaust emissions produced by an internal combustion engine comprises a plurality of means for determining a corresponding plurality of different operating parameters of an internal combustion engine and producing a corresponding plurality of operating parameter values corresponding thereto, a number of auxiliary emission control devices (AECDs) each producing an independent emission level as a function of at least one of any of said plurality of operating parameter values, and a control computer determining a maximum allowable emission level as a maximum one of a reference emission level and each of said emission levels produced by said number of AECDs, said computer controlling an air handling system of said engine as a function of said maximum allowable emission level such that exhaust emissions produced by said engine are limited to said maximum allowable emission level.

In accordance with still another aspect of the present invention, a method of controlling exhaust emissions produced by an internal combustion engine comprises determining a plurality of operating parameters each corresponding to a different operating condition of an internal combustion engine, determining a number of emission levels each corresponding to a different auxiliary emission control device (AECD) and each as a function of at least one of any of said plurality of operating parameters, determining a maximum allowable emission level as a maximum one of a reference emission level and said number of emission levels, and controlling an air handling system of said engine as a function of said maximum allowable emission level such that exhaust emissions produced by said engine are limited to said maximum allowable emission level.

In accordance with still a further aspect of the present invention, a system for controlling exhaust emissions produced by an internal combustion engine comprises means for determining a first operating parameter of an internal combustion engine and producing a first operating parameter value corresponding thereto, a first auxiliary emission control device (AECD) producing a first state value indicative of a first operating condition of said engine as a function of at least said first operating parameter value, and a control computer controlling exhaust emissions produced by said engine by controlling an air handling system of said engine as a function of said first state value.

In accordance with yet another aspect of the present invention, a system for controlling exhaust emissions produced by an internal combustion engine comprises a plurality of means for determining a corresponding plurality of different operating parameters of an internal combustion engine and producing a corresponding plurality of operating parameter values corresponding thereto, a number of auxiliary emission control devices (AECDs) producing a corresponding number of independent state values each as a function of at least one of any of said plurality of operating parameter values, and a control computer controlling exhaust emissions produced by said engine by controlling an air handling system of said engine as a function of said number of state values.

In accordance with still a further aspect of the present invention, a method of controlling exhaust emissions produced by an internal combustion engine comprises determining a plurality of operating parameters each corresponding to a different operating condition of an internal combustion engine, determining a number of state values each corresponding to a different auxiliary emission control device (AECD) and each as a function of at least one of any of said plurality of operating parameters, and controlling exhaust emissions produced by said engine by controlling an air handling system of said engine as a function of said first state value.

One object of the present invention is to provide a system for controlling exhaust emissions produced by an internal combustion engine by prescribing a maximum allowable emission level and controlling an air handling system of the engine to limit exhaust emissions produced by the engine to the maximum allowable emission level.

Another object of the present invention is to provide such a system that further accommodates any number of auxiliary emission control devices (AECDs).

A further object of the present invention is to provide such a system that determines the maximum allowable emission level as a maximum one of a reference emission level and any number of auxiliary emission levels associated with any corresponding number of AECDs.

Still another object of the present invention is to provide such a system responsive to the operational states of one or more of the AECDs to take action in addition to maintaining exhaust emissions below the maximum allowable emission level in order to achieve a desired engine operational goal such as, for example, lowering turbocharger turbine speed, lowering EGR system heat rejection, increasing fuel economy, and the like.

These and other objects of the present invention will become more apparent from the following description of the preferred embodiments.

DESCRIPTION OF THE PREFERRED EMBODIMENTS

Figure 1:
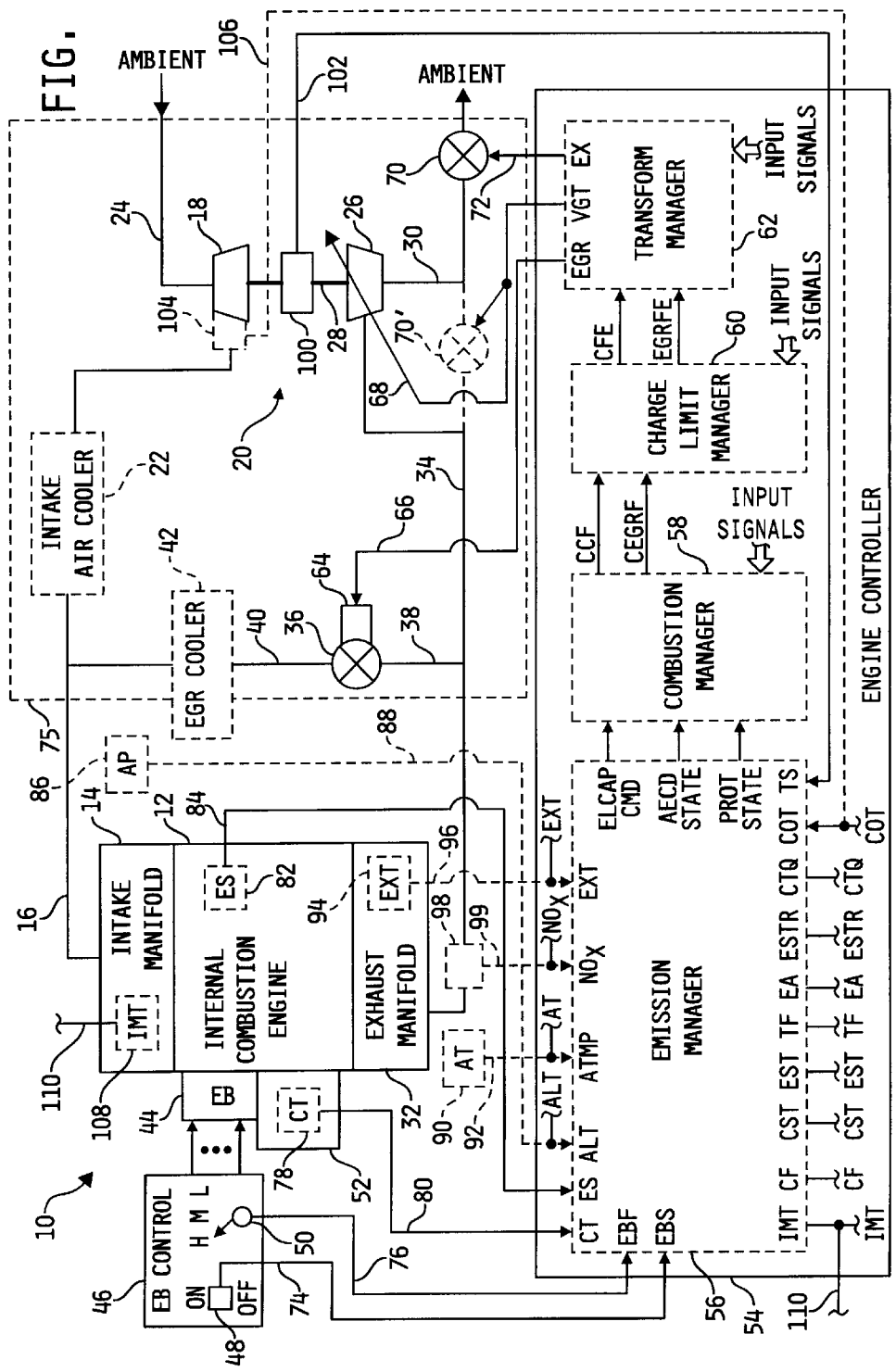
FIG. 1 is a diagrammatic illustration of one preferred embodiment of a system for controlling exhaust emissions produced by an internal combustion engine, in accordance with the present invention.

For the purposes of promoting an understanding of the principles of the invention, reference will now be made to a number of preferred embodiments illustrated in the drawings and specific language will be used to describe the same. It will nevertheless be understood that no limitation of the scope of the invention is thereby intended, such alterations and further modifications in the illustrated embodiments, and such further applications of the principles of the invention as illustrated therein being contemplated as would normally occur to one skilled in the art to which the invention relates.

Referring now to FIG. 1, one preferred embodiment of a system 10 for controlling exhaust emissions produced by an internal combustion engine 12, in accordance with the present invention, is shown. System 10 includes an internal combustion engine 12 having an intake manifold 14 fluidly coupled to a compressor 18 of a turbocharger 20 via intake conduit 16, wherein the compressor 18 receives fresh air via intake conduit 24. Optionally, as shown in phantom in FIG. 1, system 10 may include an intake air cooler 22 of known construction disposed in line with intake conduit 16 between the turbocharger compressor 18 and the intake manifold 14. The turbocharger compressor 18 is mechanically coupled to a turbocharger turbine 26 via drive shaft 28, wherein turbine 26 is fluidly coupled to an exhaust manifold 32 of engine 12 via exhaust conduit 34, and is further fluidly coupled to ambient via exhaust conduit 30. An EGR valve 36 or other suitable flow restriction mechanism is disposed in fluid communication with exhaust conduit 34 via a first EGR conduit 38, and is disposed in fluid communication with intake conduit 16 via a second EGR conduit 40. Optionally, as shown in phantom in FIG. 1, system 10 may include an EGR cooler 56 of known construction disposed in-line with EGR conduit 40 between EGR valve 36 and intake conduit 16.

System 10 includes an engine controller 54 that is preferably microprocessor-based and is generally operable to control and manage the overall operation of engine 12. Engine controller 54 includes a memory unit (not shown) as well as a number of inputs and outputs for interfacing with various sensors and systems coupled to engine 12. Controller 54, in one embodiment, may be a known control unit sometimes referred to as an electronic or engine control module (ECM), electronic or engine control unit (ECU) or the like, or may alternatively be any control circuit capable of operation as described hereinafter.

In accordance with the present invention, engine controller 54 includes an emissions manager block 56 receiving a number of input signals and producing an emissions level cap command (ELCAP CMD), a protection state data structure (PROT STATE) and an AECD state value (AECD STATE), each in a manner to be more fully described hereinafter. Engine controller 54 further includes a combustion manager block 58 receiving the ELCAP CMD and AECD STATE values, the PROT STATE data structure, and other input signals produced by various engine/vehicle operation sensors and/or sensing systems and/or other internally generated control values, and producing commanded start-of-injection (CSOI), commanded charge flow (CCF) and commanded EGR fraction (CEGRF). In one embodiment, the combustion manager block 58 includes a control strategy operable to schedule charge flow, start-of-injection and EGR fraction commands as functions of one or more of the various input signals, and one such control strategy particularly suitable for use with the present invention is described in co-pending U.S. application Ser. No. 10/059,619, entitled SYSTEM FOR PRODUCING CHARGE FLOW AND EGR FRACTION COMMANDS BASED ON ENGINE OPERATING CONDITIONS, which is assigned to the assignee of the present invention, and the disclosure of which is incorporated herein by reference.

Engine controller 54 further includes a charge limit manager 60 receiving the commanded charge flow (CCF) and commanded EGR fraction (CEGRF) values from the combustion manager block 58 as well as other input signals, and producing charge flow error (CFE) and EGR fraction error (EGRFE) values as functions thereof. In one embodiment, the charge limit manager 60 includes a control strategy operable to arbitrate between the commanded charge flow and EGR fraction values (CCF and CEGRF) produced by block 58 and the corresponding capabilities of the engine's air handling system (i.e., EGR and/or turbocharger control mechanisms described hereinabove), and produce the charge flow error (CFE) and EGR fraction error (EGRFE) output values as functions thereof. One such control strategy particularly suitable for use with the present invention is described in co-pending U.S. application Ser. No. 09/773,151, entitled SYSTEM FOR MANAGING CHARGE FLOW AND EGR FRACTION IN AN INTERNAL COMBUSTION ENGINE, which is assigned to the assignee of the present invention, and the disclosure of which is incorporated herein by reference.

A transform manager block 62 is also included within the engine controller 54 and is responsive to the charge flow error (CFE) and EGR fraction error (EGRFE) values produced by the charge limit manager 60, as well as to a number of other input signals, to produce a number of EGR system/turbocharger control signals EGR, VGT and EX for controlling EGR flow and/or turbocharger swallowing capacity/efficiency. For example, an EGR output of transform manager 62 is electrically connected to an actuator 64 of EGR valve 36 via signal path 66, wherein the EGR valve actuator 64 is responsive to the EGR signal on signal path 66 to establish a corresponding position of EGR valve 36, and hence a desired cross-sectional flow area therethrough. A variable geometry turbocharger (VGT) output of transform manager 62 is electrically connected to a turbocharger actuating mechanism via signal path 68, wherein the turbocharger actuating mechanism includes an actuator for modulating the geometry, or swallowing capacity, of the turbocharger turbine 26. The VGT output of transform manager 62 may be alternatively or additionally electrically connected to a wastegate 70' via signal path 68, wherein one end of wastegate 70' is fluidly connected to exhaust conduit 34 and the opposite end of wastegate 70' is fluidly connected to exhaust conduit 30. The transform manager 62 may be configured, in this embodiment, to controllably routing exhaust gas around turbine 26 between exhaust conduits 30 and 24, thereby controlling the swallowing capacity of turbine 26. Finally, an exhaust throttle output (EX) of transform manager 62 is electrically connected to an exhaust valve 70 disposed in-line with exhaust conduit 30 between the turbocharger turbine 26 and ambient. Exhaust valve 70 is responsive to the control signal produced at the EX output of the transform manager 62 to establish a corresponding position of exhaust valve 70, and hence a desired cross-sectional flow area therethrough. It is to be understood that if the turbocharger actuating mechanism includes a wastegate 70', the output of the wastegate 70' may be connected either upstream or downstream with respect to the exhaust throttle 70.

In one embodiment, the transform manager 62 includes a control strategy operable to control any one, or combination of, the foregoing flow control actuators including the EGR valve 36, via the EGR output thereof, the exhaust throttle 70, via the EX output thereof, and any of a number of variable geometry turbocharger actuators (including one or more actuators for modulating the actual geometry of the turbine and/or wastegate 70' for controlling bypass exhaust flow around the turbine 26), via the VGT output thereof. One such control strategy particularly suited for use with the present invention is described in co-pending U.S. patent application Ser. No. 09/773,654, entitled SYSTEM FOR DECOUPLING EGR FLOW AND TURBOCHARGER SWALLOWING CAPACITY/EFFICIENCY CONTROL MECHANISMS, which is assigned to the assignee of the present invention, and the disclosure of which is incorporated herein by reference.

System 10 further includes a number of sensors and/or sensing systems for providing the engine controller 54 with information relating to the operation of engine 12. For example, engine 12 includes an engine compression brake 44 of known construction that is electrically connected to an engine brake control unit 46. Unit 46 includes an on/off switch 48 that is electrically connected to an engine brake status (EBS) input of the emission manager 56 via signal path 74. Additionally, unit 46 includes a multiple-position switch 50 that is electrically connected to an engine brake fraction (EBF) input of the emissions manager 56 via signal path 76. In one embodiment, the engine 12 is a 6-cylinder engine and the multiple-position switch 50 has three settings; high (H), medium (M) and low (L). In the low (L) setting, the engine compression brake 44 is operable to provide compression braking in two of the six cylinders. In the medium (M) setting, engine compression braking is accomplished in four of the six cylinders and in the high (H) setting, engine compression braking is accomplished in all six cylinders. Thus, in the low (L) setting, EBF=⅓, in the medium (M) setting, EBF=⅔, and in the high (H) setting, EBF=1. Those skilled in the art will recognize that other engine compression brake configurations may be used, such as those having individually actuatable compression brake units for each cylinder or for other cylinder combinations, and that the number of cylinders may vary from engine to engine. Accordingly, it will be understood that the EBF signal provided to the emission manager 56 is not limited to the embodiment illustrated herein, but may include any engine compression brake configuration used with an engine having any number of cylinders.

Engine 12 further includes a cooling system 52 of known construction and operable to circulate a coolant fluid through engine 12 for the purpose of maintaining the operating temperature of engine 12 within a desired range, as is known in the art. Cooling system 52 includes a coolant temperature sensor 78 of known construction disposed in fluid communication with the coolant fluid circulating through cooling system 52, and electrically connected to a coolant temperature input (CT) of emission manager 56 via signal path 80. The coolant temperature sensor 78 is accordingly operable to provide the emission manager 56 with a signal indicative of the engine operating temperature. Alternatively, engine 14 may be outfitted with an engine temperature sensor operable to produce a temperature signal indicative of engine operating temperature, and in this embodiment the temperature signal produced by the engine temperature sensor may replace the coolant temperature signal as the CT input to the emission manager 56.

System 10 further includes an engine speed sensor 82 of known construction that is electrically connected to an engine speed input (ES) of the emission manager 56 via signal path 84. Engine speed sensor 82 is operable to produce an engine speed signal indicative of the rotational speed of engine 12, and in one embodiment is a Hall effect sensor operable to determine engine speed by sensing passage thereby of a number of equi-angularly spaced teeth formed on a gear or tone wheel. Alternatively, engine speed sensor 82 may be any other known sensor operable to produce an engine speed signal including, but not limited to, a variable reluctance sensor or the like.

Turbocharger 20 further includes a turbocharger speed sensor 100 of known construction that is electrically connected to a turbocharger speed input (TS) of emission manager 56 via signal path 102. Turbocharger speed sensor 100 is operable to produce a turbocharger speed signal indicative of the rotational speed of shaft 28, and therefore of the rotational speed of the compressor and turbine wheels (not shown). In one embodiment, turbocharger speed sensor 100 is a variable reluctance sensor, although the present invention contemplates using other known sensors operable to sense turbocharger speed and provide corresponding turbocharger speed information to the emission manager 56.

The engine controller 54 further includes a number of so-called "virtual" sensors producing engine operational values for use by the emission manager 56. As this term is used herein, a "virtual" sensor is a software algorithm that is executed by engine controller 54 and that is operable to estimate one or more engine/vehicle operating conditions based on one or more other engine/vehicle operating conditions. In one embodiment, for example, engine controller 54 includes a known virtual altitude sensor implemented as a software algorithm operable to estimate the altitude, relative to a reference altitude; e.g., sea level or some other reference, based on other engine/vehicle operating conditions, and to provide this altitude estimate to an altitude (ALT) input of the emission manager 56. Alternatively, as shown in phantom in FIG. 1, system 10 may include an ambient pressure sensor 86 of known construction and electrically connected to the ALT input of the emission manager 56 via signal path 88. In this embodiment, the emission manager 56 is operable to map the ambient pressure signal provided by sensor 86 to appropriate altitude values in a known manner.

Engine controller 54 further includes a known virtual ambient temperature sensor implemented as a software algorithm operable to estimate ambient temperature based on other engine/vehicle operating conditions, and to provide this ambient temperature estimate to an ambient temperature input (ATMP) of the emission manager 56. Alternatively, as shown in phantom in FIG. 1, system 10 may include an ambient temperature sensor 90 of known construction and electrically connected to the ATMP input of the emission manager 56 via signal path 92. In this embodiment, the ambient temperature sensor 90 is operable to provide a signal directly to the emission manager 56 that is indicative of ambient temperature.

Engine controller 54 further includes a known virtual $NO_x$ sensor implemented as a software algorithm operable to estimate $NO_x$ level in the engine exhaust stream based on other engine/vehicle operating conditions, and to provide this $NO_x$ level estimate to a $NO_x$ input of the emission manager 56. Alternatively, as shown in phantom in FIG. 1, system 10 may include a $NO_x$ sensor 98 of known construction disposed in-line with the exhaust conduit 34 and electrically connected to the $NO_x$ input of the emission manager 56 via signal path 99. In this embodiment, the $NO_x$ sensor 98 is operable to provide a signal directly to the emission manager 56 that is indicative of the $NO_x$ level in the exhaust gas produced by engine 12.

Engine controller 54 further includes a known virtual exhaust temperature sensor implemented as a software algorithm operable to estimate the temperature of exhaust gas produced by the engine 12 based on other engine/vehicle operating conditions, and to provide this exhaust temperature estimate to an exhaust temperature input (EXT) of the emission manager 56. Details relating to one such exhaust gas temperature estimation strategy that is suitable for use with the present invention is described in co-pending U.S. application Ser. No. 09/774,664, entitled SYSTEM FOR ESTIMATING ENGINE EXHAUST TEMPERATURE, which is assigned to the assignee of the present invention, and the disclosure of which is incorporated herein by reference. Alternatively, as shown in phantom in FIG. 1, system 10 may include an exhaust temperature sensor 94 of known construction disposed in fluid communication with the exhaust gas produced by the engine 12 and electrically connected to the EXT input of the emission manager 56 via signal path 96. In this embodiment, the exhaust temperature sensor 94 is operable to provide a signal directly to the emission manager 56 that is indicative of the temperature of the exhaust gas produced by engine 12.

Engine controller 54 further includes a known virtual turbocharger compressor outlet temperature sensor implemented as a software algorithm operable to estimate the temperature of the air provided at the outlet of the turbocharger compressor 18 based on other engine/vehicle operating conditions, and to provide this compressor outlet temperature estimate to an compressor outlet temperature input (COT) of the emission manager 56. Details relating to one such turbocharger compressor outlet temperature estimation strategy that is suitable for use with the present invention is described in co-pending U.S. application Ser. No. 09/774,959, entitled SYSTEM FOR ESTIMATING TURBOCHARGER COMPRESSOR OUTLET TEMPERATURE, which is assigned to the assignee of the present invention, and the disclosure of which is incorporated herein by reference. Alternatively, as shown in phantom in FIG. 1, system 10 may include a temperature sensor 104 of known construction disposed in fluid communication with the outlet of the turbocharger compressor 18 and electrically connected to the COT input of the emission manager 56 via signal path 106. In this embodiment, the compressor outlet temperature sensor 104 is operable to provide a signal directly to the emission manager 56 that is indicative of the temperature of the outlet of the turbocharger compressor 18.

System 10 further includes an intake manifold temperature sensor 108 of known construction disposed in fluid communication with the intake manifold 14 and electrically connected to an intake manifold temperature (IMT) input of the emission manager 56 via signal path 110. In this embodiment, the intake manifold temperature sensor 108 is operable to provide a signal directly to the emission manager 56 that is indicative of the temperature of the intake manifold 14. Alternatively, engine controller 54 may include a known virtual intake manifold temperature sensor implemented as a software algorithm operable to estimate the temperature of the intake manifold 14 based on other engine/vehicle operating conditions, and to provide this intake manifold temperature estimate to the IMT input of the emission manager 56.

Engine controller 54 is further operable to generate, determine or estimate internally thereto a number of control values that are indicative of certain engine operating conditions, and to provide such control values as inputs to the emission manager 56. For example, engine controller 54 is operable to determine a charge flow value (CF) indicative of a measure of charge flow into the intake manifold 14 of engine 12, wherein one embodiment of a charge flow estimation strategy suitable for use with the present invention will be described hereinafter with respect to FIG. 5. Engine controller 54 is also operable to estimate a charge saturation temperature (CST) that is indicative of the temperature of saturated charge entering the engine 12 via the intake manifold 14 using known techniques therefore.

Engine controller is further operable to estimate an exhaust gas saturation temperature (EST) that is indicative of the temperature of saturated exhaust gas produced by engine 12 using known techniques therefore. Additionally, the engine controller 54 is operable to determine a total fueling value (TF) indicative of the total or final commanded fuel value for fueling engine 12, using known techniques therefore. Further, the engine controller 12 is operable to determine a net combustion torque value (CTQ) indicative of a nominal engine output torque that is adjusted to take into account pumping losses, friction losses, etc., using known techniques therefore. Further still, the engine controller is operable to determine an engine active value (EA) indicative of whether the engine is active or running, using known techniques therefore. Additionally, the engine controller 54 is operable to determine an engine starting value (ESTR) indicative of whether the engine is currently being cranked or started, using known techniques therefore.

It is to be understood that none of the foregoing virtual sensors, engine operating parameter estimation techniques and/or engine operating condition determination techniques form part of the present invention. Rather, the present invention is directed to one or more strategies for producing an emissions level cap command, a protection state data structure and an AECD state value based on any of a number of inputs thereto, wherein one or more such inputs may be provided by one of the virtual sensors, engine operating parameter estimation techniques and/or engine operating condition determination techniques just described. Finally, as used hereinafter, the term air-handling system of engine 12, or air-handling system, should be understood to include any one or more of the components contained within the dashed-line box 75 illustrated in FIG. 1.

Figure 2:
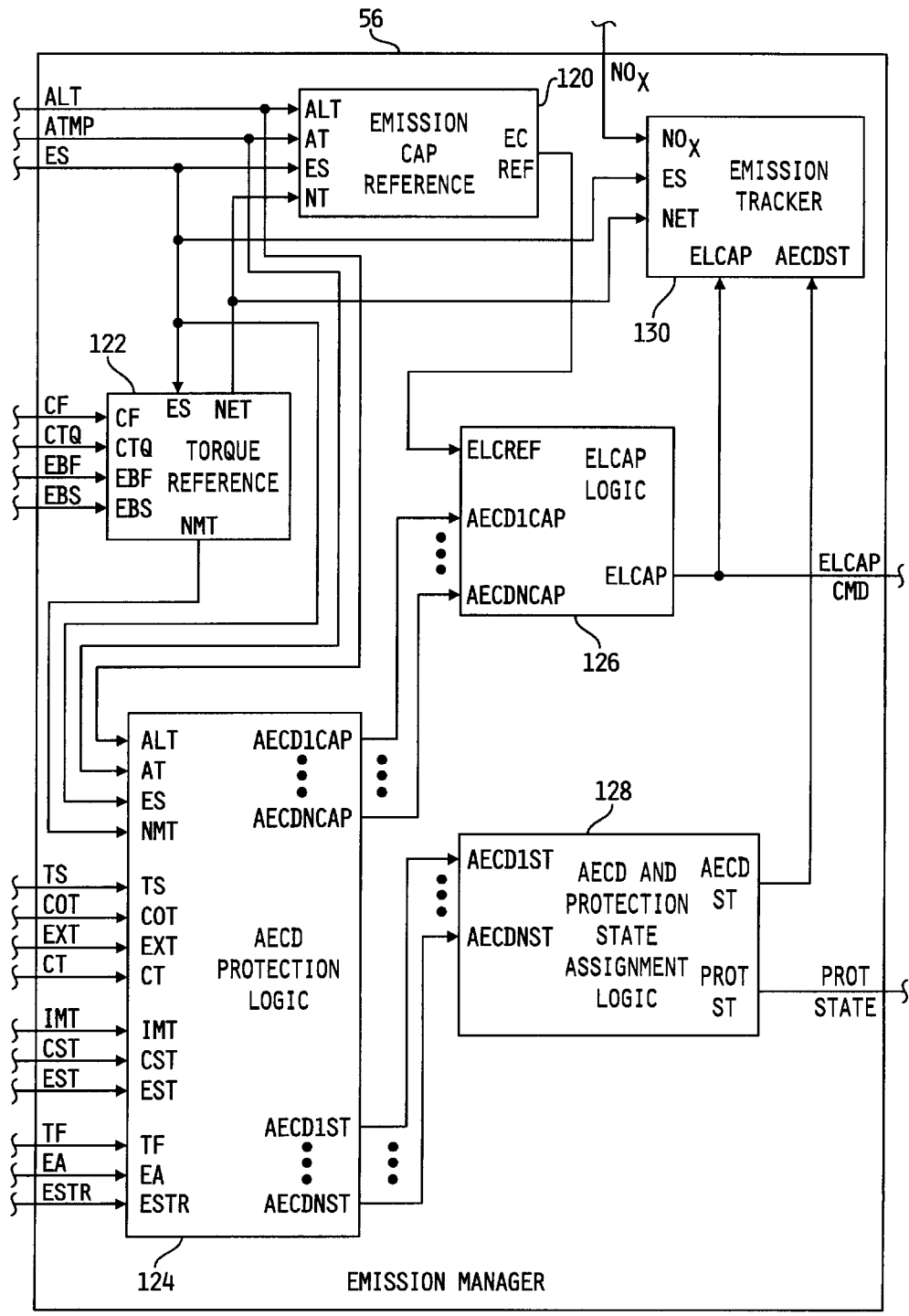
FIG. 2 is a diagrammatic illustration of one preferred embodiment of the emissions manager block of FIG. 1, in accordance with the present invention.

Referring now to FIG. 2, one preferred embodiment of the emission manager block 56 of FIG. 1, in accordance with the present invention, is shown. Block 56 includes an emission cap reference block 120 having inputs connected to corresponding ALT, ATMP and ES inputs of block 56. An additional input, NT, receives a net torque value produced at the NET output of a torque reference block 122. The torque reference block 122 has inputs connected to corresponding CF, CTQ, EBF, EBS and ES inputs of block 56, and is operable to produce a net engine torque value at output NET and a net motor torque value at output NMT. Block 56 further includes an AECD protection logic block 124 having inputs connected to corresponding ALT, ATMP, ES, TS, COT, EXT, CT, IMT, CST, EST, TF, EA and ESTR inputs of block 56 and to the NMT output of block 122. It is to be understood that the inputs to the AECD protection logic block 124 are provided mainly by way of example, and those skilled in the art will recognize that the number as well as the type of inputs to block 124 will generally be defined by the number and type of AECDs implemented by engine controller 54.

In any case, the emission manager block 56 further includes an emission level (EL) cap logic block 126 having an emission level cap reference input (ELC REF) connected to an emission cap reference output (EC REF) of the emission cap reference block 120, and a number, N, of AECD cap inputs (AECD1CAP–AECDNCAP) connected to corresponding AECD cap outputs of the AECD protection logic block 124. The variable "N" may be any positive integer and corresponds generally to the number of AECDs implemented by the engine controller 54. The output (ELCAP) of the EL cap logic block 126 defines the emission level cap command output ELCAP CMD of the emission manager block 56, and is also provided as an input to an emission tracker block 130. The emission manager block 56 further includes an AECD and protection state assignment logic block 128 having "N" AECD state inputs (AECD1ST–AECDNST) connected to corresponding AECD state outputs of the AECD protection logic block 124. The output PROT ST defines the protection state output PROT STATE of the emission manager block 56, and is also provided as an input to the emission tracker block 130. The output AECD ST of block 128 defines an AECD state value and is also provided as an input to the emission tracker block 130. Block 130 further receives as inputs the net engine torque value (NET) produced by block 122, the engine speed value provided to the ES input of block 56 and the $NO_x$ value provided to the $NO_x$ input of block 56.

Figure 3:
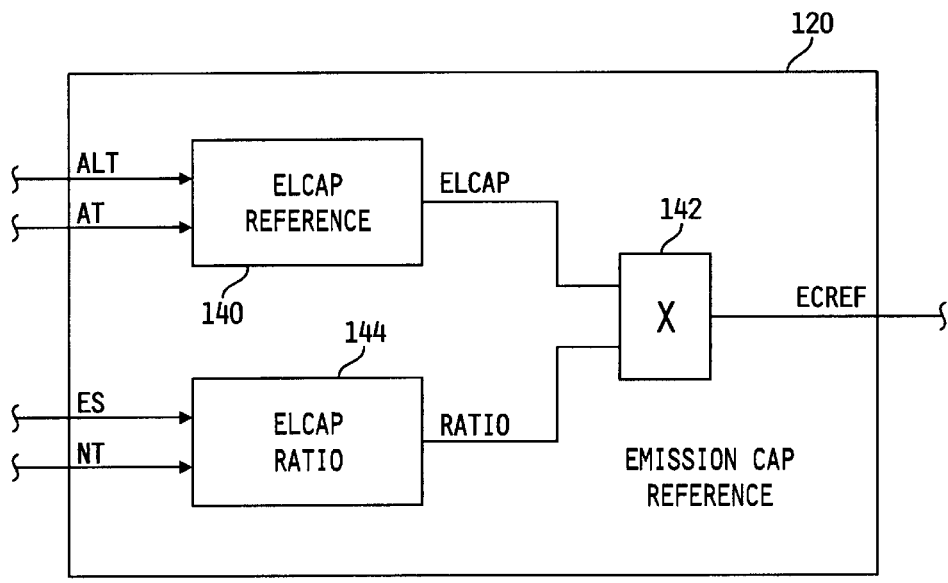
FIG. 3 is a diagrammatic illustration of one preferred embodiment of the emission cap reference block of FIG. 2, in accordance with the present invention.

Referring now to FIG. 3, one preferred embodiment of the emission cap reference block 120 of FIG. 2, in accordance with the present invention, is shown. Block 120 includes an emission level cap reference block 140 having inputs connected to the ALT and AT inputs of the emission manager block 56, and an output producing an emission level cap value ELCAP. An emission level cap ratio block 144 has inputs connected to the ES input of the emission manager block 56 and to the net engine torque output of the torque reference block 122 (FIG. 2), and an output producing a ratio value based on the two inputs. The outputs of blocks 140 and 144 are provided as inputs to a two-input multiplier block 142 having an output defining the emission cap reference output EC REF of block 120. In one embodiment, blocks 140 and 144 are implemented as three-dimensional tables. The rows and columns of the table of block 140 are defined by altitude and ambient temperature values and the table itself is populated with emission level cap values based on the corresponding altitude and ambient temperature values, wherein such emission level cap values are typically developed through experimentation and will vary depending upon the application. The rows and columns of the table of block 144 are defined by engines speed and net engine torque values and the table itself is populated with ratio values that reflect engine speed/load ratios based on the corresponding engine speed and net engine torque values. Intermediate table values for either of blocks 140 or 144 may be determined via known techniques such as, for example, interpolation.

It is to be understood that while blocks 140 and 144 have been described as being implemented within the engine controller 54 as three-dimensional tables, those skilled in the art will recognize that blocks 140 and/or 144 could alternatively be implemented in the form of multiple tables, one or more graphs or charts, and/or one or more equations, and that any such alternate implementations are well within the knowledge of a skilled programmer. It should also be understood that any such alternate implementations are intended to fall within the scope of the present invention. In any case, the emission level cap reference value produced at the EC REF output of block 120 represents a maximum allowable emission level based on present altitude and ambient temperature conditions as well as a ratio of engine speed and load. This emission level cap reference value is provided to the EL CAP logic block 126 where it may be modified depending upon the cap (maximum) values of any AECDs implemented by the engine controller 54, in a manner to be described more fully hereinafter with respect to FIGS. 6 and 7.

Figure 4:
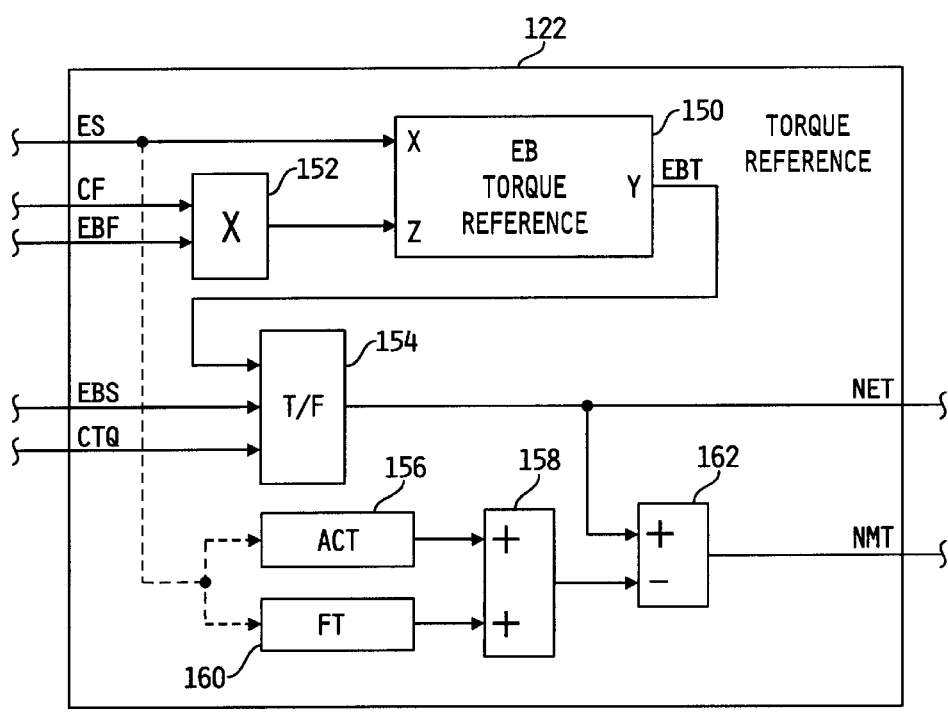
FIG. 4 is a diagrammatic illustration of one preferred embodiment of the torque reference block of FIG. 2, in accordance with the present invention.

Referring now to FIG. 4, one preferred embodiment of the torque reference block 122 of FIG. 2, in accordance with the present invention, is shown. Block 122 includes an engine compression brake (EB) torque reference block 150 having a first input connected to the engine speed (ES) input of the emission manager block 56 and a second input connected to an output of a two-input multiplication block 152. One input of multiplication block 152 receives the charge flow input (CF) and the remaining input receives the engine brake fraction input (EBF) to the emission manager block 56. The output of the multiplication block 152 is the product of CF and EBF and represents the fraction of the total charge flow entering the intake manifold 14 that is directed to the cylinders involved in active compression braking. This charge flow fraction is provided as a second input to the EB torque reference block 150, wherein block 150 is operable to produce an engine brake torque value EBT that represents an amount of engine retarding torque produced under the current engine speed, charge flow and engine compression brake setting conditions. In one embodiment, the EB torque reference block 150 is implemented as a three-dimensional table wherein the rows and columns of the table of block 150 are defined by engine speed and charge flow fraction, and the table itself is populated with engine brake torque values based on the corresponding engine speed and charge flow fraction values. Such engine brake torque values are typically developed through experimentation and will be understood to vary depending upon the application. Intermediate table values for block 150 may be determined via known techniques such as, for example, interpolation. It is to be understood that while block 150 has been described as being implemented within the engine controller 54 as a three-dimensional table, those skilled in the art will recognize that block 150 could alternatively be implemented in the form of multiple tables, one or more graphs or charts, and/or one or more equations, and that any such alternate implementations are well within the knowledge of a skilled programmer. It should also be understood that any such alternate implementations are intended to fall within the scope of the present invention.

Figure 5:
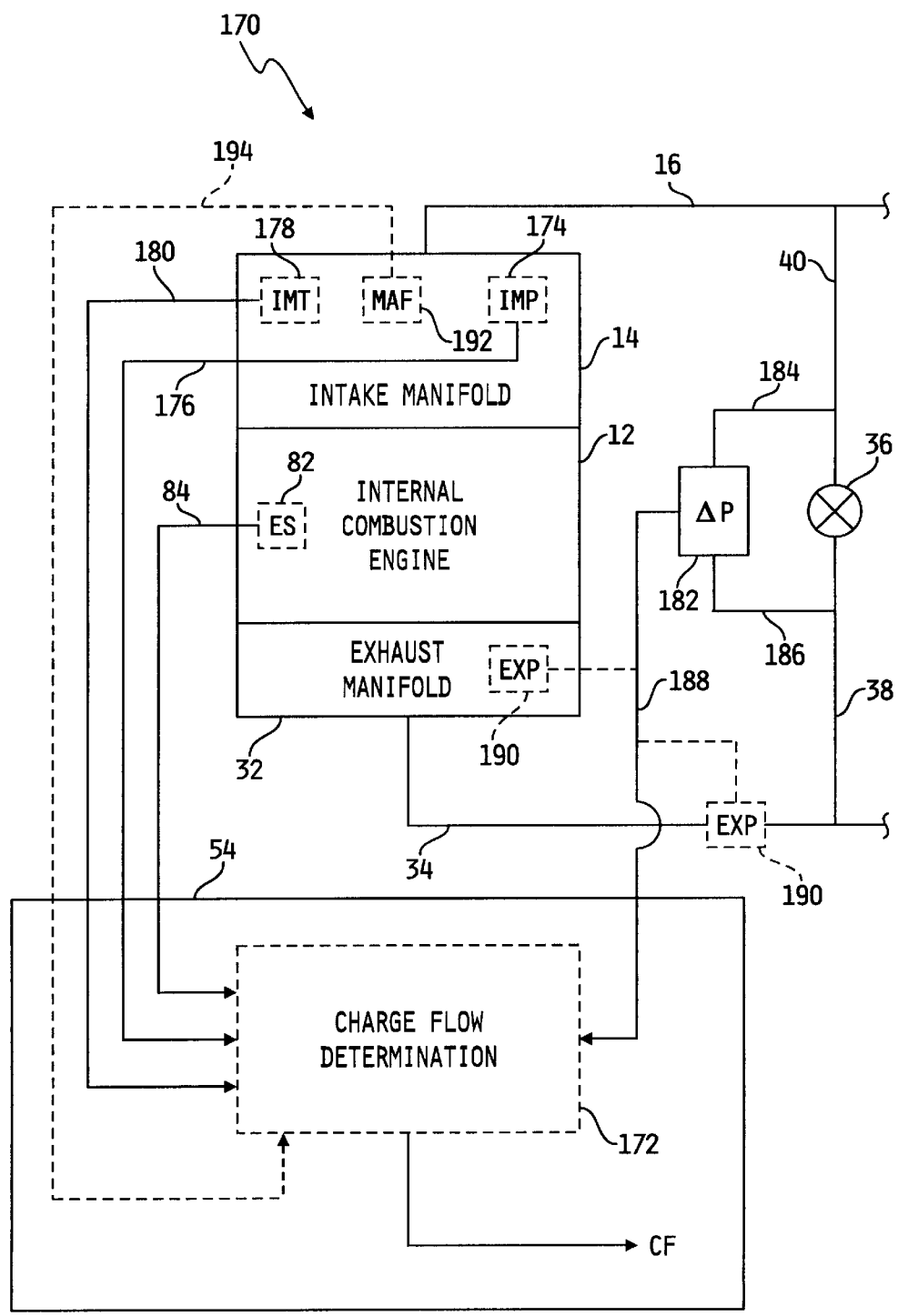
FIG. 5 is a diagrammatic illustration of one preferred embodiment of a technique for determining a charge flow parameter for use by the torque reference block of FIG. 4.

Referring now to FIG. 5, a system 170 is shown for estimating charge flow (CF); i.e., the mass flow of charge supplied to intake manifold 14, for use by the torque reference block 122 illustrated in FIGS. 2 and 4. As used herein, the term "charge" is defined as a composition of fresh air and recirculated exhaust gas. In any case, system 170 includes several components in common with system 10 of FIG. 1, and like numbers are therefore used to identify like components.

As described with respect to system 10 of FIG. 1, system 170 includes an internal combustion engine 12 having an intake manifold 14 fluidly coupled to an intake conduit 16, wherein intake manifold 14 receives fresh air via conduit 16. An exhaust manifold 32 of engine 12 expels exhaust gas to ambient via exhaust conduit 34, and an EGR valve 36 is disposed in fluid communications with the intake and exhaust conduits 16 and 32 respectively via conduits 38 and 40.

A ΔP sensor 182 is positioned across the EGR valve 36 and is electrically connected to a charge flow determination block 172 of engine controller 54 via signal path 188, and an engine speed sensor 82 electrically connected to block 172 via signal path 84. An intake manifold temperature sensor (IMT) 178 is disposed in fluid communication with the intake manifold 14 of engine 12, and is electrically connected to the charge flow determination block 172 of engine controller 54 via signal path 180. Intake manifold 14 also includes an intake manifold pressure sensor (IMP) 174 in fluid communication therewith and electrically connected to the charge flow determination block 172 of engine controller 54 via signal path 176. Optionally, as will be described in greater detail hereinafter, system 170 may include an exhaust pressure sensor (EXP) 190 disposed in fluid communication with the exhaust manifold 32 or an exhaust pressure sensor (EXP) 190 disposed in fluid communication with exhaust conduit 34 as shown in phantom in FIG. 5.

In one preferred embodiment, the charge flow determination block 172 of engine controller 54 is operable to compute an estimate of the mass charge flow (ECF) into intake manifold 14 by first estimating the volumetric efficiency ($\eta_v$) of the charge intake system, and then computing ECF as a function of $\eta_v$ using a conventional speed/density equation. Any known technique for estimating $\eta_v$ may be used, and in one preferred embodiment of block 172 $\eta_v$ is computed according to a known Taylor mach number-based volumetric efficiency equation given as:

$$\eta_v = A_1 * \{(Bore/D)^2 * (stroke * ES)^B / sqrt(\gamma * R * IMT) * [(1+EP/IMP) + A_2]\} + A_3,$$

where, $A_1$, $A_2$, $A_3$ and B are all calibratable parameters preferably fit to the volumetric efficiency equation based on mapped engine data, Bore is the intake valve bore length, D is the intake valve diameter, stroke is the piston stroke length, wherein Bore, D and stroke are generally dependent upon engine geometry, $\gamma$ and R are known constants ($\gamma * R = 387.414$ KJ/kg/deg K), ES is engine speed, IMP is the intake manifold pressure, EP is the exhaust pressure, where EP=IMP+$\Delta$P, and IMT=intake manifold temperature.

From the foregoing equation, it should be apparent that system 170 may substitute an exhaust pressure sensor 190, as shown in phantom in FIG. 5, for the $\Delta$P sensor 182, if such exhaust pressure sensors that are capable of withstanding harsh environments associated with the exhaust manifold 32 and/or exhaust conduit 34 are commercially available. For purposes of this description, however, operation of the charge flow determination block 172 will be described as utilizing the differential pressure signal produced by the $\Delta$P sensor 182.

With the volumetric efficiency value v estimated according to the foregoing equation, an estimated charge flow value ECF is preferably computed according to the equation:

$$ECF = \eta_v * V_{DIS} * ES * IMP / (2 * R * IMT),$$

where, $\eta_v$ is the estimated volumetric efficiency, $V_{DIS}$ is engine displacement and is generally dependent upon engine geometry, ES is engine speed, IMP is the intake manifold pressure, R is a known gas constant (R=54), and IMT is the intake manifold temperature.

It is to be understood that the foregoing embodiment for estimating the mass flow of charge into the intake manifold 14 is provided to illustrate only one example technique for determining this engine operating parameter, and that the present invention should not be limited thereby. The present invention contemplates that one or more other known charge flow estimation techniques may substituted for the foregoing technique in practicing the present invention, or that system 170 may alternatively include within the intake manifold 14 a mass air flow sensor 192 electrically connected to the charge flow determination block 172 via signal path 194 as shown in phantom in FIG. 5. In this alternate embodiment, the charge flow determination block 172 may simply be configured to convert the signal provided by sensor 192 directly to a mass flow value in a manner well-known in the art. In any case, the charge flow determination block 172 is operable to produce the charge flow value CF for use by the torque reference determination block 122 illustrated in FIGS. 2 and 4.

Referring again to FIG. 4, torque reference block 122 further includes a true/false block 154 having a control input connected to the engine compression brake status (EBS) input of the emission manager block 56, a "true" input receiving the engine brake torque value (EBT) produced by the EB torque reference block 150 and a "false" input receiving the net combustion torque value (CTQ) input to the emission manager block 56. In one embodiment, engine controller 54 includes a table populated with CTQ values based on nominal engine output torque values as functions of commanded engine fueling values, wherein the CTQ values are essentially the nominal engine output torque values adjusted to account for pumping losses, friction losses, and the like. The CTQ table thus produces CTQ values as functions of corresponding commanded fueling values in a manner known in the art. It should be understood, however, that the present invention contemplates utilizing other known techniques for generating the net combustion torque values, and any other such known techniques are intended to fall within the scope of the present invention. In any case, the output of true/false block 154 defines the net engine torque output (NET) of torque reference block 122, and if the engine compression brake is active, as is the case if the on/off switch 48 of the engine brake unit 46 is in the "on" position, the net engine torque value NET is the engine brake torque value EBT produced by the EB torque reference block 150. If, on the other hand, the engine compression brake is not active, as is the case if the on/off switch 48 of the engine brake unit 46 is in the "off" position, the net engine torque value NET is the net combustion torque value CQT resulting from the currently commanded fueling value.

Torque reference block 122 further includes an accessory torque block 156 and a fan torque block 160. In one embodiment block 156 has stored therein a first constant torque value indicative of a nominal retarding torque value due to accessory use including, for example, a cab air conditioning unit, power steering unit, alternator and/or other accessories that consume engine output power, and block 160 has stored therein a second constant torque value indicative of a nominal retarding torque value resulting from the use of an engine cooling fan. Alternatively, as shown in phantom in FIG. 5, blocks 156 and 160 may each have inputs connected to the engine speed input of the emission manager block 56. In this embodiment, the accessory torque block 156 includes one or more equations defining accessory retarding torque as a function of engine speed. For example, while the engine alternator (not shown) is known to require constant power independent of engine speed, air conditioning loss, if an air conditioning unit (not shown) is activated, is generally understood to be proportional to $ES^2$, power steering loss is understood to be proportional to $ES^2$, and so forth. Block 156 accordingly includes one or more equations that estimate a retarding torque due to accessory use using at least the foregoing relationships. Likewise, the fan torque block 160 includes one or more equations defining engine cooling fan torque as a function of engine speed, wherein engine cooling fan loss is generally understood to be proportional to $ES^3$. Block 160 accordingly includes one or more equations that estimate a retarding torque resulting from engine cooling fan use according to the foregoing relationship. In any case, outputs of each of blocks 156 and 160 are provided as inputs to a two-input summation block 158, and the output of block 158 thus represents a total engine retarding torque attributable to engine cooling fan and engine accessory use. This output is provided as an inverting input to an arithmetic block 162 having a second input receiving the net engine torque value (NET) produced by true/false block 154. The output of arithmetic block 162 defines the net motor torque output (NMT) of the torque reference block 122 and represents net engine torque value (NET) less the combined retarding torque attributable to the engine cooling fan and any engine accessories.

Figure 6:
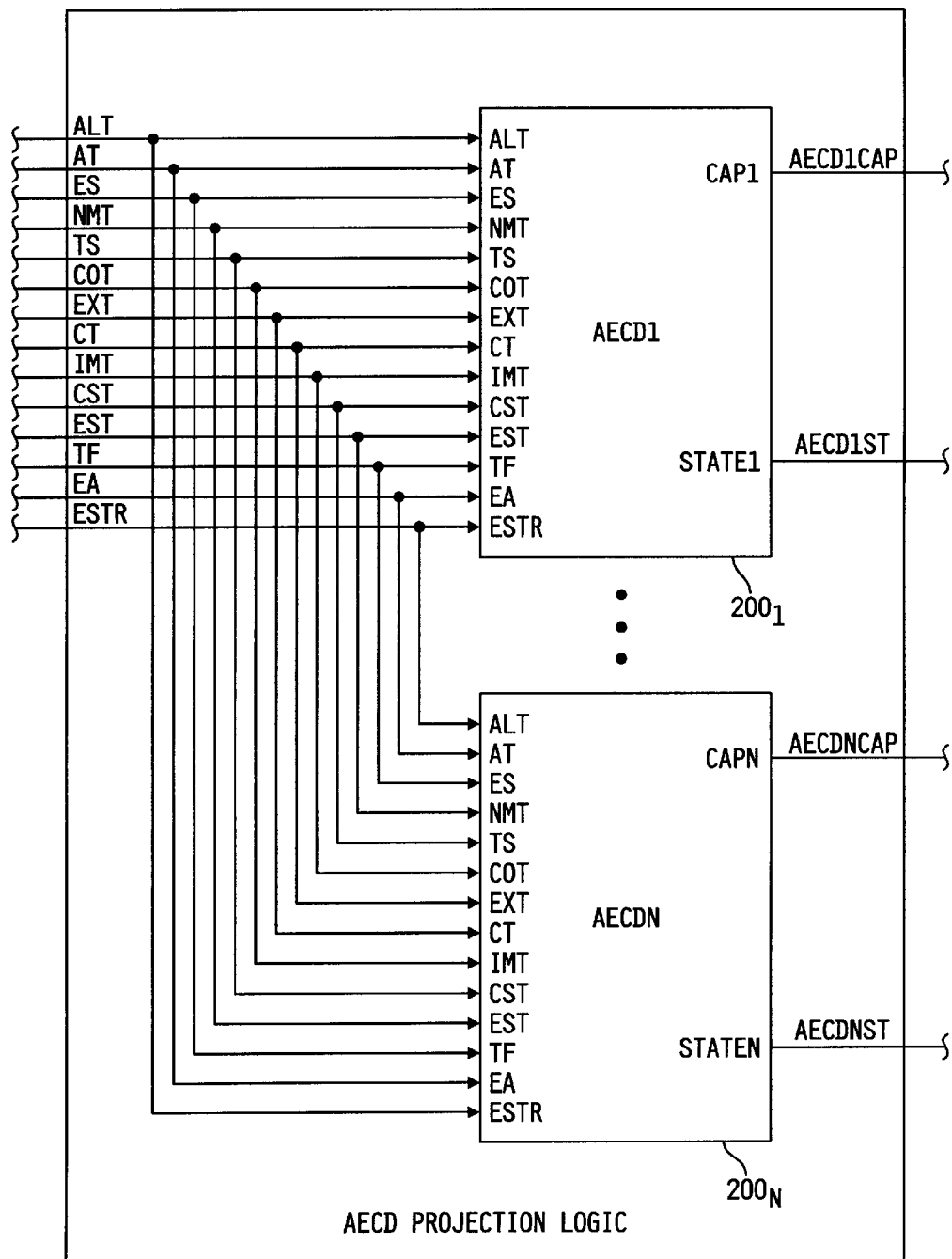
FIG. 6 is a diagrammatic illustration of one preferred embodiment of the AECD protection logic block of FIG. 2, in accordance with the present invention.

Referring now to FIG. 6, one preferred embodiment of the AECD protection logic block 124 of FIG. 2, in accordance with the present invention, is shown. Block 124 includes a number of AECDs $200_1$–$200_N$, wherein N may be any positive integer, and wherein each AECD $200_1$–$200_N$ is illustrated in FIG. 6 as having inputs connected to corresponding ALT, AT, ES, NMT, TS, COT, EXT, CT, IMT, CST, EST, TF, EA and ESTR inputs of the emission manager block 56. It should be understood that the use of any AECD $200_1$–$200_N$ must typically be negotiated with, and approved by, a governing body such as the EPA prior to inclusion within the engine controller 54. The definition of any such AECD, including its inputs and overall operation will therefore necessarily be highly proprietary in nature and likely maintained in secrecy. Accordingly, although each AECD $200_1$–$200_N$ of FIG. 6 is illustrated as having identical inputs, such a configuration is shown only to provide example inputs that may be useful for defining AECD operation. Any actual AECD implemented within engine controller 54 may use any one or combination of the example inputs illustrated in FIG. 6, and/or may use one or more other inputs not shown in any of the attached drawings but which are commonly understood to be monitored or measurable engine and/or vehicle operating parameters. As they relate to the present invention, any such AECD $200_1$–$200_N$ is operable to determine a corresponding AECD emission level cap value (AECD1CAP–AECDNCAP) and a corresponding AECD state value (AECD1ST–AECDNST), each as a function of its corresponding input variables. In general, each AECD emission cap level value (AECD1CAP–AECDNCAP) represents a maximum desired emission level resulting from the use of the corresponding AECD. Any such AECD emission cap level may be greater than, less than or equal to the emission level reference value produced at the EC REF output of the emission cap reference block 120 (FIGS. 2 and 3). Each AECD state value (AECD1ST–AECDNST), on the other hand, represents the operational status of each corresponding AECD. Thus, for each AECD that is currently active, its AECD state value will indicate an active status, and for each AECD that is currently inactive, its AECD state value will indicate an inactive status.

Figure 7:
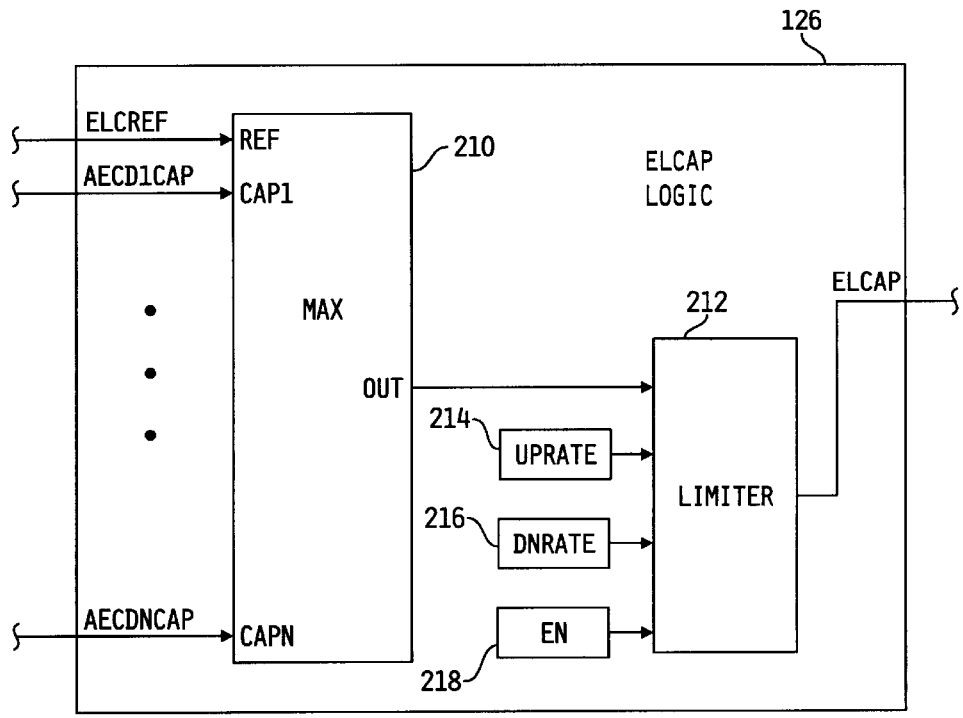
FIG. 7 is a diagrammatic illustration of one preferred embodiment of the EL cap logic block of FIG. 2, in accordance with the present invention.

Referring now to FIG. 7, one preferred embodiment of the EL cap logic block 126 of FIG. 2, in accordance with the present invention, is shown. Block 126 includes a MAX block 210 having an ELCREF input receiving the emission level cap reference value produced by the emission cap reference block 120, and a number of AECD emission level cap inputs CAP1–CAPN each receiving a corresponding AECD emission level cap value produced by the AECD protection logic block 124 at outputs AECD1CAP–AECDNCAP respectively. MAX block 210 has a single output OUT producing the maximum value of the various inputs thereto. A limiter circuit 212 has a first input connected to the OUT output of MAX block 210, a second input receiving a signal increasing rate value UPRATE from block 214, a third input receiving a signal decreasing rate value DNRATE from block 216 and a fourth input receiving an enable signal EN from block 218. An output of limiter circuit 212 defines the ELCAP output of block 126 (as well as the ELCAP CMD output of the emission manager 56).

In operation, MAX block 210 receives the emission level cap reference value produced by the emission cap reference block 120, as well as any AECD emission level cap values produced by the AECD protection logic block 124, and produces as an output the maximum value thereof. In cases where the emission manager block 56 does not include any AECDs, the output of MAX block 210 will simply be the emission level cap reference value produced by block 120. In cases where the emission manager block 56 includes one or more AECDs, one of the AECD emission level cap values produced by block 124 may be the largest-valued input to MAX block 210 in which case MAX block 210 will produce this AECD emission level cap value as its output. In any case, the emission level cap value produced by MAX block 210 is supplied as an input to limiter circuit 212, wherein the rate of increase of this maximum emission level cap value is limited by the value UPRATE, and the rate of decrease is limited by the value DNRATE. In order to prevent the emission level cap command produced by the emission manager 54 from drifting during key on and cranking conditions, the enable value EN is only active when all of the inputs to engine controller 54 are stable. Controller 54 includes known circuitry for making such a determination. The output of the EL cap logic block 126 is thus the rate-limited output of MAX block 210, which is also the ELCAP CMD output of the emission manager block 56.

Figure 8:
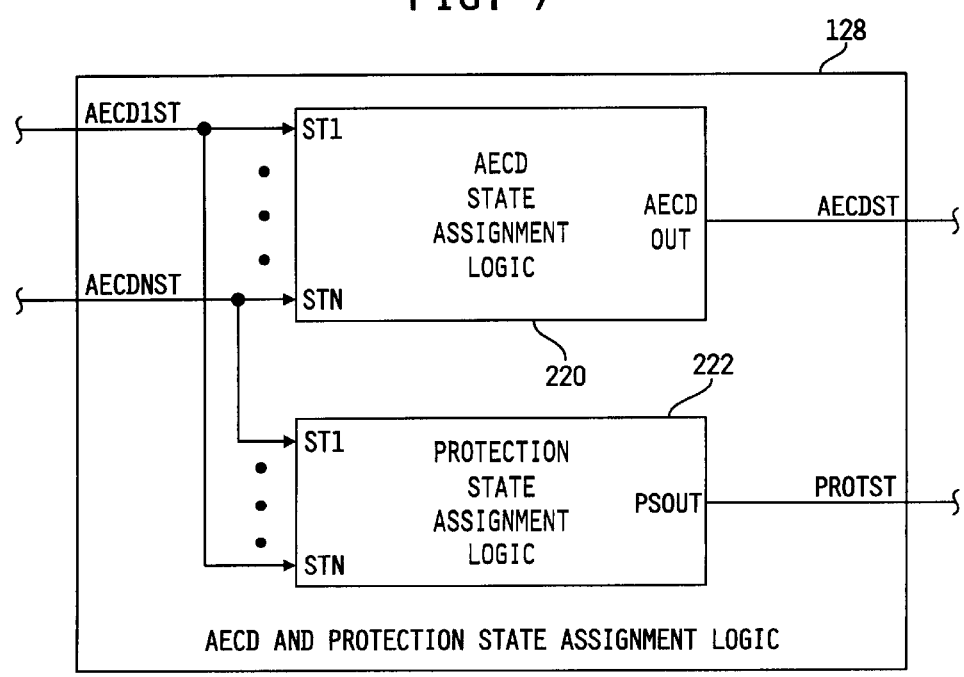
FIG. 8 is a diagrammatic illustration of one preferred embodiment of the AECD and protection state assignment logic block of FIG. 2, in accordance with the present invention.

Referring now to FIG. 8, one preferred embodiment of the AECD and protection state assignment block 128, in accordance with the present invention, is shown. Block 128 includes an AECD state assignment block 220 having a number, N, of inputs ST1–STN connected to corresponding outputs AECD1ST–AECDNST of the AECD protection logic block 124 (FIG. 2), and an output AECD OUT defining the AECD ST output of block 128. Generally, the AECD state assignment block 220 is operable to produce a value at its output AECD OUT that is indicative of whether any one or more of the AECDs included within the emission manager 54 are currently active. Details relating to one preferred embodiment of bock 220 will be described in greater detail hereinafter with respect to FIG. 9.

The AECD and protection state assignment logic block 128 further includes a protection state assignment logic block 222, and like block 220, block 222 also has a number, N, of inputs ST1–STN connected to corresponding outputs AECDIST–AECDNST of the AECD protection logic block 124 (FIG. 2). An output PSOUT of block 222 defines the PROT ST output of block 128. Generally, the protection state assignment logic block 222 is operable to produce a data structure at its output PSOUT that is indicative of the operational state; i.e., active or inactive, of each of the AECDs included within the emission manager block 56. Details relating to one preferred embodiment of bock 222 will be described in greater detail hereinafter with respect to FIG. 10.

Figure 9:
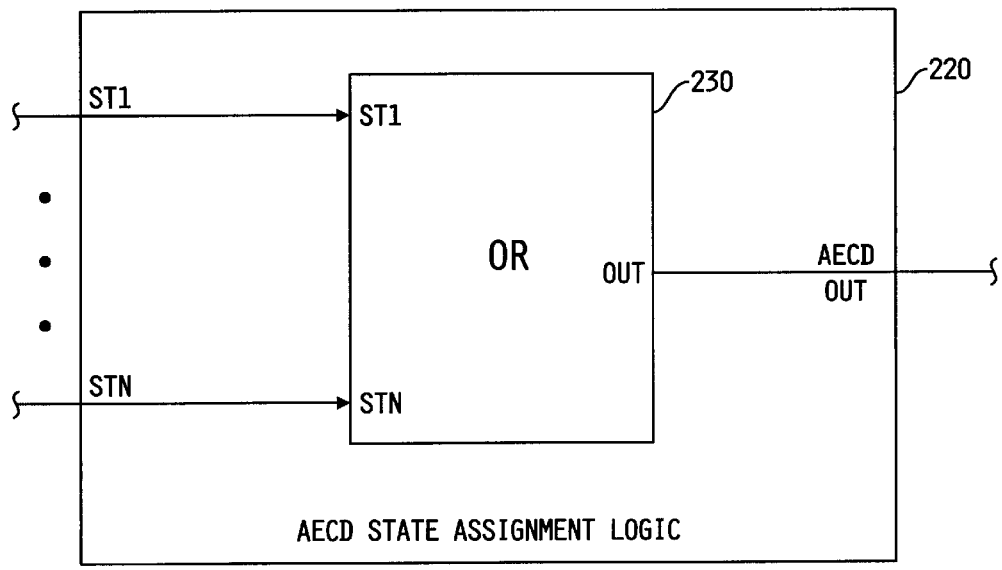
FIG. 9 is a diagrammatic illustration of one preferred embodiment of the AECD state assignment logic block of FIG. 7, in accordance with the present invention.

Referring now to FIG. 9, one preferred embodiment of the AECD state assignment logic block 220 illustrated in FIG. 8, in accordance with the present invention, is shown. Block 220 includes an N-input OR block 230 receiving the "N" AECD state inputs and producing an output OUT that defines the output AECD OUT of the AECD state assignment logic block 220 and also the AECD ST output of the AECD and protection state assignment logic block 128 (FIG. 2). In operation, the OR logic block 230 is operable to produce an active output if any one or more of the AECD state inputs is active. As it relates to the present invention, this information is used to track AECD operational status as will be described in greater detail hereinafter with respect to FIG. 11.

Figure 10:
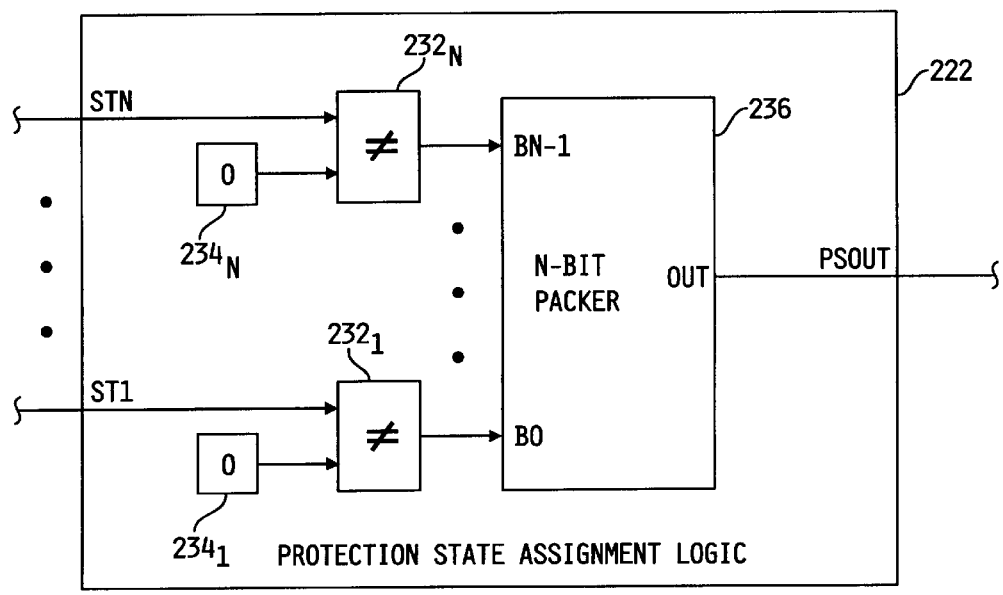
FIG. 10 is a diagrammatic illustration of one preferred embodiment of the protection state assignment logic block of FIG. 7, in accordance with the present invention.

Referring now to FIG. 10, one preferred embodiment of the protection state assignment logic block 222 illustrated in FIG. 8, in accordance with the present invention, is shown. Block 222 includes number, N, of inequality logic blocks $232_1$–$232_N$ each having one input receiving a different AECD state input via a corresponding input ST1–STN of block 222, and each having another input receiving a logic low value; e.g., zero, from a corresponding one of blocks $234_1$–$234_N$. The outputs of each of the inequality logic blocks $232_1$–$232_N$ are connected to corresponding inputs B0–BN−1 of an N-bit packer block 236 the output OUT of block 236 defines the output PSOUT of logic block 222, the PROTST output of logic block 128 and the PROT STATE output of the emission manager block 56.

In the operation of block 222, the AECD operational state values provided to inputs ST1–STN are compared by the inequality logic blocks $232_1$–$232_N$ to the zero values of blocks $234_1$–$234_N$. For each of the AECD operational state values that are active; e.g., logic high level, the inequality is true and the corresponding B0–BN−1 input of the N-bit packer block 236 is accordingly a logic high level. Conversely, for each of the AECD operational state values that are inactive, e.g., some level other than a logic high level, the inequality is false and the corresponding B0–BN−1 input of the N-bit packer block 236 is accordingly a logic low level. Packer block 236 is operable to pack the various input values provided to into an N-bit data structure representative of the operational state of each of the AECDs included within the emission manager block 56. The combustion manager block 58 is preferably configured to unpack this data structure for processing thereof in a manner that is more fully described in co-pending U.S. application Ser. No. 10/059,619, entitled SYSTEM FOR PRODUCING CHARGE FLOW AND EGR FRACTION COMMANDS BASED ON ENGINE OPERATING CONDTIONS, which is assigned to the assignee of the present invention, and the contents of which have been incorporated herein by reference.

Figure 11:
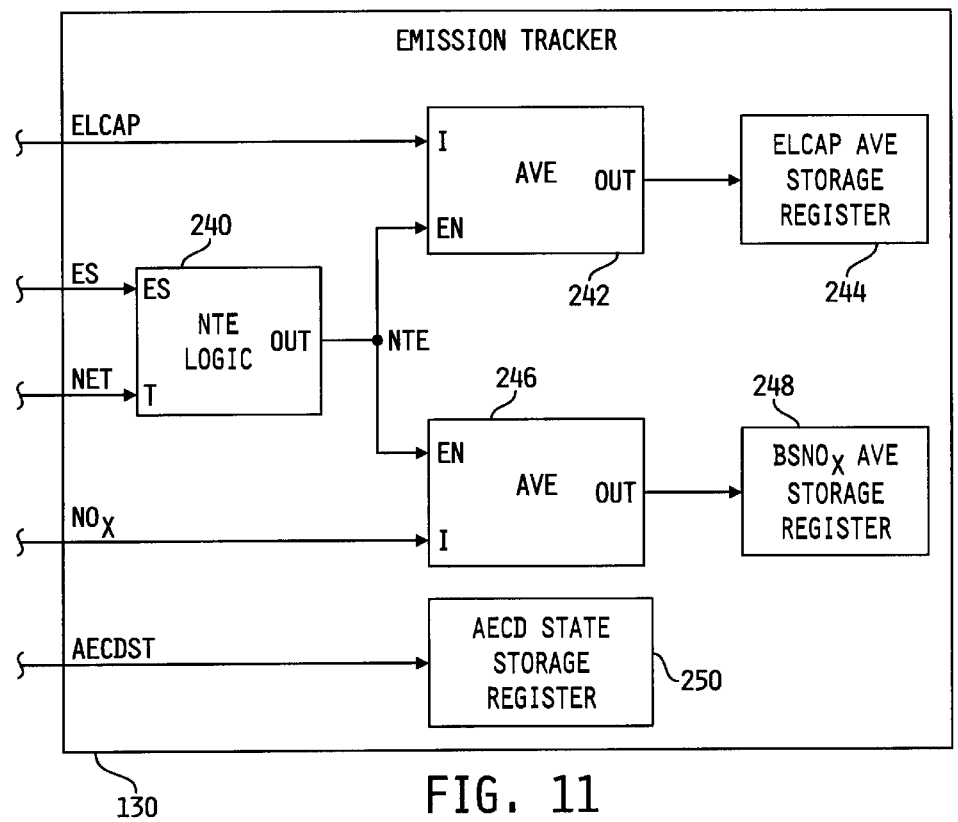
FIG. 11 is a diagrammatic illustration of one preferred embodiment of the emission tracker block of FIG. 2, in accordance with the present invention.

Referring now to FIG. 11, one preferred embodiment of the emission tracker block 130 of FIG. 2, in accordance with the present invention, is shown. Block 130 includes a $NO_x$ tracking enable (NTE) logic block 240 receiving as inputs the engine speed signal ES on signal path 84 and the net engine torque (NET) produced by the torque reference block 120 (FIG. 2) and producing an enable value NTE as a function thereof. Details relating to one preferred embodiment of the NTE logic block 240 will be described in greater detail hereinafter with respect to FIG. 12.

The NTE output of NTE logic block 240 is provided to an enable input (EN) of an averaging block 242 having a data input (I) receiving the emission level cap value produced at the output of the EL cap logic block 126. The output OUT of averaging block 242 is provided to an ELCAP average storage register 244. The NTE output of NTE logic block 240 is also provided to an enable input (EN) of another averaging block 246 having a data input (I) receiving the $NO_x$ value input to the emission manager block 56. The output OUT of averaging block 246 is provided to a brake specific (BS) $NO_x$ average storage register 248. The AECD operational state value produced at the AECD ST output of the AECD and protection state assignment logic block 128 is provided as an input to an AECD state storage register 250.

In the operation of the emission tracker block 130, averaging blocks 242 and 246 are configured, when enabled by an enabling NTE value, to collect an average of the emission level cap command and brake specific $NO_x$ values respectively. In one illustrative embodiment, averaging blocks 242 and 246 are each configured to collect, when enabled, a 30-second rolling average of the emission level cap command and brake specific $NO_x$ values respectively, although the present invention contemplates that blocks 242 and 246 may alternatively be configured to implement other known data averaging strategies. In any case, averaging blocks 242 and 246 are configured to store the averaged data into the corresponding storage registers 244 and 248. Thus, for example, in embodiments wherein blocks 242 and 246 are configured to collect 30-second rolling averages, each storage register 244 and 248 is configured to store therein a 30 second window of data. When averaging blocks 242 and 246 are disabled by a disabling NTE value, blocks 242 and 246 are reset and held to zero until the NTE value is again enabled. The AECD state storage register 250 is simply operable to maintain therein a value indicative of whether any AECD included within the emission manager 56 is currently enabled.

Figure 12:
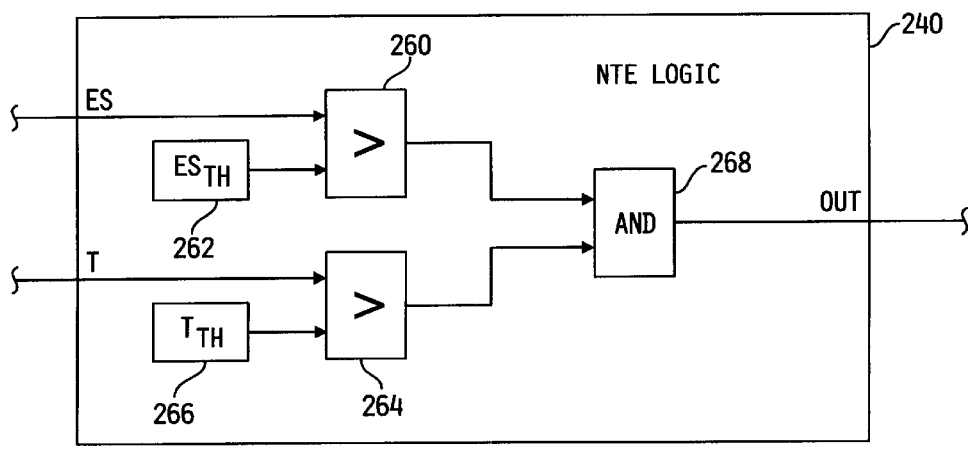
FIG. 12 is a diagrammatic illustration of one preferred embodiment of the NTE logic block of FIG. 11, in accordance with the present invention.

Referring now to FIG. 12, one preferred embodiment of the NTE logic block 240 of FIG. 11, in accordance with the present invention, is shown. Block 240 includes a first arithmetic logic block 260 having one input receiving the engine speed signal ES and a second input receiving an engine speed threshold value $ES_{TH}$ stored in block 262. Arithmetic logic block 260 is configured as a "greater than" logic block such that the output thereof is true only when the engine speed signal ES exceeds the engine speed threshold value $ES_{TH}$. Block 240 further includes a second arithmetic logic block 264 having one input receiving the net engine torque value produced at the NET output of torque reference block 122 and a second input receiving an engine torque threshold value $T_{TH}$ stored in block 266. Arithmetic logic block 264 is also configured as a "greater than" logic block such that the output thereof is true only when the net engine torque exceeds the engine torque threshold $T_{TH}$. The two outputs of arithmetic logic blocks 260 and 264 are "ANDed" by a two-input AND logic block 268, the output of which defines the output OUT of NTE logic block 240. The NTE value produced by block 240 is thus enabling, or a logic high level, only if the engine speed (ES) exceeds the engine speed threshold $ES_{TH}$ and the net engine torque value exceeds the torque threshold $T_{TH}$, and is otherwise disabling, or a logic low level.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. System for controlling exhaust emissions produced by an internal combustion engine, the system comprising:

an engine speed sensor sensing a rotational speed of an internal combustion engine and producing a speed signal corresponding thereto;

means for determining an altitude of said engine and producing an altitude value corresponding thereto;

means for determining an ambient temperature external to said engine and producing a temperature value corresponding thereto;

means for determining an output torque produced by said engine and producing a torque value corresponding thereto; and a control computer determining a maximum allowable emission level as a function of said speed signal, said altitude value, said temperature value and said torque value, said computer controlling an air handling system of said engine as a function of said maximum allowable emission level such that exhaust emissions produced by said engine are limited to said maximum allowable emission level.

2. The system of claim 1 further including:
means for determining a first engine operating parameter different from said rotational speed of said engine, said altitude of said engine, said ambient temperature external to said engine and said output torque produced by said engine, and producing a first operating parameter value corresponding thereto; and
a first auxiliary emission control device (AECD) producing a first auxiliary emission level as a function of at least one of any of said engine speed signal, said altitude value, said temperature value, said torque value and said first operating parameter value;
wherein said control computer is operable to determine said maximum allowable emission level as a function of said engine speed signal, said altitude value, said temperature value, said torque value and said first auxiliary emission level.

3. The system of claim 2 wherein said control computer is operable to determine a reference emission level as a function of said engine speed signal, said altitude value, said temperature value and said torque value, said control computer determining said maximum allowable emission level as a maximum of said reference emission level and said first auxiliary emission level.

4. The system of claim 3 wherein said control computer includes:
means responsive to said altitude value and said temperature value for determining an emission level cap value;
means responsive to said engine speed signal and said torque value for determining a ratio value; and
means for determining said reference emission level as a product of said emission level cap value and said ratio value.

5. The system of claim 1 further including:
a plurality of means for determining a corresponding plurality of engine operating parameters each different from said rotational speed of said engine, said altitude of said engine, said ambient temperature external to said engine and said output torque produced by said engine, and producing a plurality of operating parameter values corresponding thereto; and
a number of auxiliary emission control devices (AECDs) producing a corresponding number of independent auxiliary emission levels each as a function of at least one of any of said engine speed signal, said altitude value, said temperature value, said torque value and said plurality of operating parameter values;
wherein said control computer is operable to determine a reference emission level as a function of said engine speed signal, said altitude value, said temperature value and said torque value, said control computer determining said maximum allowable emission level as a maximum of said reference emission level and said number of auxiliary emission levels.

6. The system of claim 5 further including an engine compression brake coupled to said engine;
wherein said means for determining an output torque of said engine includes:

means for determining a retarding torque produced by said engine; and
means for producing said retarding torque as said torque value when said engine compression brake is operational and for producing a commanded engine output torque value as said torque value when said engine compression brake is not operational.

7. The system of claim 6 wherein said means for determining an output torque of said engine further includes:
means responsive to said engine speed signal for determining a first resistance torque attributable to operation of a cooling fan driven by said engine; and
means for producing a motor torque value by subtracting said first resistance torque from said torque value, said motor torque value corresponding to one of said plurality of operating parameter values.

8. The system of claim 7 wherein said means for determining an output torque of said engine further includes means responsive to said engine speed signal for determining a second resistance torque attributable to operation of at least one accessory driven by said engine;
and wherein said means for producing a motor torque value is operable to produce said motor torque value by subtracting a sum of said first and second resistance torques from said torque value.

9. The system of claim 6 wherein said control computer includes:
means responsive to said altitude value and said temperature value for determining an emission level cap value;
means responsive to said engine speed signal and said torque value for determining a ratio value; and
means for determining said reference emission level as a product of said emission level cap value and said ratio value.

10. The system of claim 5 further including a memory coupled to said control computer;
and wherein said control computer is operable to determine an enable value as a function of said engine speed signal and said torque value, said control computer storing in said memory a rolling average of said maximum allowable emission level over a predefined time interval when said enable value is active.

11. The system of claim 10 wherein said control computer is operable to produce an active enable value when said engine speed signal is greater than an engine speed threshold and said torque value is greater than a torque threshold, said control computer otherwise producing an inactive enable value.

12. The system of claim 11 further including means for determining an NOx value indicative of NOx content of exhaust gas produced by said engine;
and wherein said control computer is operable to store in said memory a rolling average of said NOx value over said predefined time interval when said enable value is active.

13. The system of claim 1 wherein said control computer includes:
means responsive to said altitude value and said temperature value for determining an emission level cap value;
means responsive to said engine speed signal and said torque value for determining a ratio value; and
means for determining said maximum allowable emission level as a product of said emission level cap value and said ratio value.

14. A method of controlling exhaust emissions produced by an internal combustion engine, the method comprising:

determining a rotational speed of an internal combustion engine;

determining an altitude of said engine;

determining an ambient temperature external to said engine;

determining an output torque produced by said engine;

determining a maximum allowable emission level as a function of said rotational speed, said altitude, said ambient temperature and said output torque; and controlling an air handling system of said engine as a function of said maximum allowable emission level such that exhaust emissions produced by said engine are limited to said maximum allowable emission level.

15. The method of claim 14 further including the steps of:

determining a plurality of operating parameters each corresponding to a different operating condition of said engine and each different from said rotational speed, said altitude, said ambient temperature and said output torque; and determining a number of auxiliary emission levels each corresponding to a different auxiliary emission control device (AECD) and each as a function of at least one of any of said rotational speed, said altitude, said ambient temperature, said output torque and said plurality of operating parameters;

and wherein the step of determining a maximum allowable emission level includes determining a reference emission level as a function of said rotational speed, said altitude, said ambient temperature and said output torque, and determining said maximum allowable emission level as a maximum one of said reference emission level and said number of auxiliary emission levels.

* * * * *